(12) United States Patent
Ballard

(10) Patent No.: US 9,061,716 B2
(45) Date of Patent: Jun. 23, 2015

(54) LIGHT-WEIGHT VEHICLE

(71) Applicant: Lon R. Ballard, Carrollton, IL (US)

(72) Inventor: Lon R. Ballard, Carrollton, IL (US)

(*) Notice: Subject to any disclaimer, the term of this patent is extended or adjusted under 35 U.S.C. 154(b) by 0 days.

(21) Appl. No.: 13/751,577

(22) Filed: Jan. 28, 2013

(65) Prior Publication Data

US 2013/0192916 A1  Aug. 1, 2013

Related U.S. Application Data

(60) Provisional application No. 61/590,907, filed on Jan. 26, 2012.

(51) Int. Cl.
| | |
|---|---|
| B62D 61/08 | (2006.01) |
| B62D 31/00 | (2006.01) |
| B62D 25/00 | (2006.01) |
| B62D 29/04 | (2006.01) |

(52) U.S. Cl.
CPC ............. B62D 31/003 (2013.01); B62D 25/00 (2013.01); B62D 61/08 (2013.01); B62D 29/046 (2013.01)

(58) Field of Classification Search
USPC .......... 180/210, 211, 291, 311, 312, 89.1, 90; 296/900, 901.01, 181.1, 181.2, 187.01, 296/187.03, 203.01
See application file for complete search history.

(56) References Cited

U.S. PATENT DOCUMENTS

| | | | |
|---|---|---|---|
| 3,559,920 A | 2/1971 | Moore | |
| 3,619,344 A | 11/1971 | Wolinski | |
| 3,853,349 A | 12/1974 | Moore | |
| 3,931,098 A | 1/1976 | Herweg et al. | |
| 4,099,280 A | 7/1978 | Hoppe et al. | |
| 4,455,338 A | 6/1984 | Henne | |
| 4,574,902 A | 3/1986 | Irimajiri | |
| 4,584,225 A * | 4/1986 | Adelman | ........................ 428/71 |
| 4,705,716 A | 11/1987 | Tang | |
| 4,710,415 A | 12/1987 | Slosberg et al. | |
| 4,944,360 A * | 7/1990 | Sturges | ........................ 180/210 |
| 5,000,515 A | 3/1991 | Deview | |
| 5,312,145 A | 5/1994 | McNeil | |
| 5,343,973 A | 9/1994 | Lanker | |
| 5,393,603 A | 2/1995 | Toyoda et al. | |
| 5,690,046 A | 11/1997 | Grzech, Jr. | |

(Continued)

FOREIGN PATENT DOCUMENTS

WO  2010107766 A1  9/2010

OTHER PUBLICATIONS

PCT International Search Report for PCT/US2013/023378 dated Apr. 10, 2013, 3 pages.

(Continued)

*Primary Examiner* — Paul N Dickson
*Assistant Examiner* — Darlene P Condra
(74) *Attorney, Agent, or Firm* — Senniger Powers LLP

(57) ABSTRACT

A motorized vehicle, including rigid core board panels joined together to form a support structure having an exterior surface and an interior surface opposite the exterior surface. The interior surface of the support structure faces an occupant compartment. Each of the panels includes a honeycomb core sandwiched between opposing fiberglass-reinforced sheets. The vehicle includes a layer of energy absorbing material mounted on the exterior surface of the support structure and wheels mounted on the support structure. At least one of the wheels is steerable from the occupant compartment. A motor is mounted on the support structure and operatively connected to at least one of the wheels.

19 Claims, 8 Drawing Sheets

(56) References Cited

U.S. PATENT DOCUMENTS

| | | | |
|---|---|---|---|
| 5,695,870 A * | 12/1997 | Kelch et al. | 428/318.4 |
| 5,707,571 A | 1/1998 | Reedy | |
| 5,806,622 A | 9/1998 | Murphy | |
| 5,819,408 A * | 10/1998 | Catlin | 29/897.2 |
| 5,952,089 A * | 9/1999 | Namura et al. | 428/318.4 |
| 6,863,339 B2 | 3/2005 | Bohm et al. | |
| 7,000,978 B1 | 2/2006 | Messano | |
| 7,062,795 B2 * | 6/2006 | Skiba et al. | 2/410 |
| 7,157,034 B2 | 1/2007 | Bristow et al. | |
| 7,189,040 B2 | 3/2007 | Sharp et al. | |
| 7,220,374 B2 | 5/2007 | Zander et al. | |
| 7,399,028 B1 | 7/2008 | Castillo et al. | |
| 7,762,375 B2 | 7/2010 | Matsuyama et al. | |
| 8,007,706 B2 | 8/2011 | Wacker et al. | |
| 2006/0243507 A1 * | 11/2006 | Huber | 180/208 |
| 2008/0119978 A1 | 5/2008 | Stieff et al. | |
| 2008/0174147 A1 * | 7/2008 | Skaradzinski | 296/181.3 |
| 2009/0159384 A1 * | 6/2009 | Chitteti et al. | 188/377 |
| 2011/0189465 A1 | 8/2011 | Maurer et al. | |
| 2012/0024612 A1 | 2/2012 | Ballard | |

OTHER PUBLICATIONS

Written Opinion of the International Searching Authority mailed Apr. 10, 2013 regarding PCT Application No. PCT/US2013/023378, 6 pages.

* cited by examiner

LIGHT-WEIGHT VEHICLE

CROSS REFERENCE TO RELATED APPLICATION

This Application claims priority to U.S. Provisional Patent Application No. 61/590,907, filed on Jan. 26, 2012, and entitled, "Configuration for Light-Weight Vehicle Chassis", which is hereby incorporated by reference in its entirety.

BACKGROUND

The present invention generally relates to vehicles, and more particularly to a light-weight vehicle having a chassis and body constructed from core board and impact absorbing foam.

Conventional light-weight motor vehicles, such as motorcycles, mopeds, and motorized trikes lack a protective body enclosing occupants. Accidents involving these types of vehicles often result in severe injuries or death due to their lack of a protective body and impact-absorbing materials. Typically, these light-weight vehicles cost less to buy and maintain, can operate in smaller spaces found in dense urban environments, and are more fuel efficient than enclosed four-wheeled vehicles. Because of these advantages, conventional light-weight vehicles remain popular in many regions despite these risks. Thus, there is a need for a light-weight vehicle having a body or enclosure that provides structural support for the vehicle and protects occupants and bystanders during impact without significantly increasing manufacturing or operating cost of the vehicle.

Some consumers prefer to customize their vehicles for aesthetic reasons. One conventional means of customizing vehicles is by painting the body, but painting is an expensive and time-consuming process. Further, a damaged body often detracts from the aesthetic appearance of the vehicle, causing consumers to want to repair the body. Replaceable panels for the body in a variety of colors and graphics would be advantageous to permit customization or replacement of damaged panels.

Fuel efficiency and low operating costs are desirable features. Conventionally, when one laterally spaced wheel on a vehicle is driven, the other wheel is also powered, even though considerable weight savings and reduced mechanical complexity could be achieved by driving only one of the laterally spaced wheels. Both wheels are driven because driving only one wheel has been found to compromise vehicle handling and stability. Thus, there is a desire to drive only one wheel to reduce weight and complexity without sacrificing handing and stability.

SUMMARY

In one aspect, the present disclosure includes a motorized vehicle, comprising a plurality of rigid core board panels joined together to form a support structure having an exterior surface and an interior surface opposite the exterior surface. The interior surface of the support structure faces an occupant compartment. Each of the panels comprises a honeycomb core sandwiched between opposing fiber-reinforced sheets. Further, the vehicle includes a layer of energy absorbing material mounted on the exterior surface of the support structure and a plurality of wheels mounted on the support structure. At least one of the wheels is steerable from the occupant compartment. A motor is mounted on the support structure and operatively connected to at least one of the wheels.

In another aspect, the present disclosure includes a motorized vehicle, comprising a support structure having a longitudinal centerline and an occupant compartment. In addition, the vehicle has a front wheel mounted on the support structure. The front wheel is steerable from the occupant compartment. The vehicle also includes a pair of rear wheels laterally spaced from each other on opposite sides of the longitudinal centerline. Further, the vehicle comprises a motor mounted on the support structure and operatively connected to one of the rear wheels.

Aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
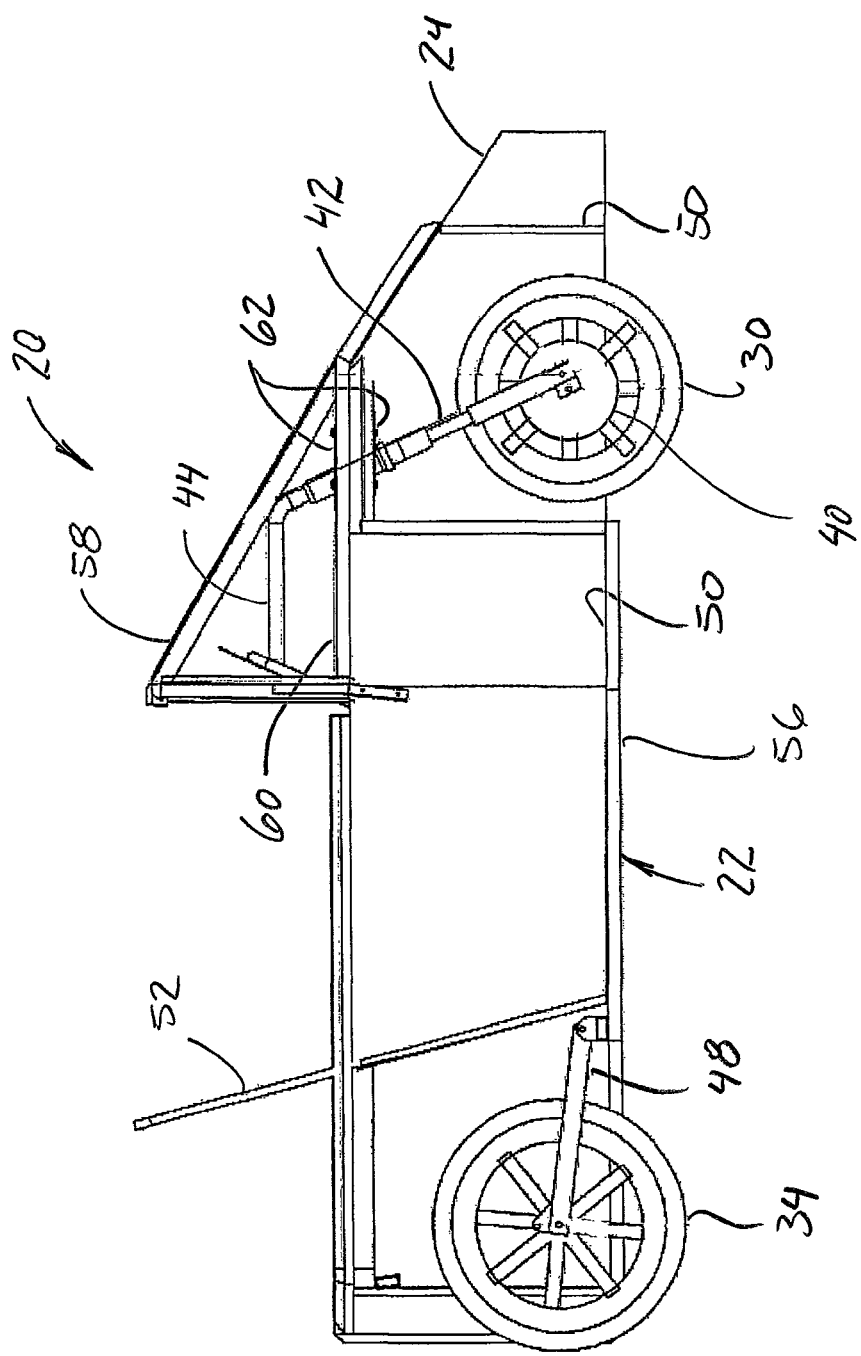
FIG. 1 is a schematic side elevation of a light-weight vehicle of a first embodiment of the present disclosure.
Figure 2:
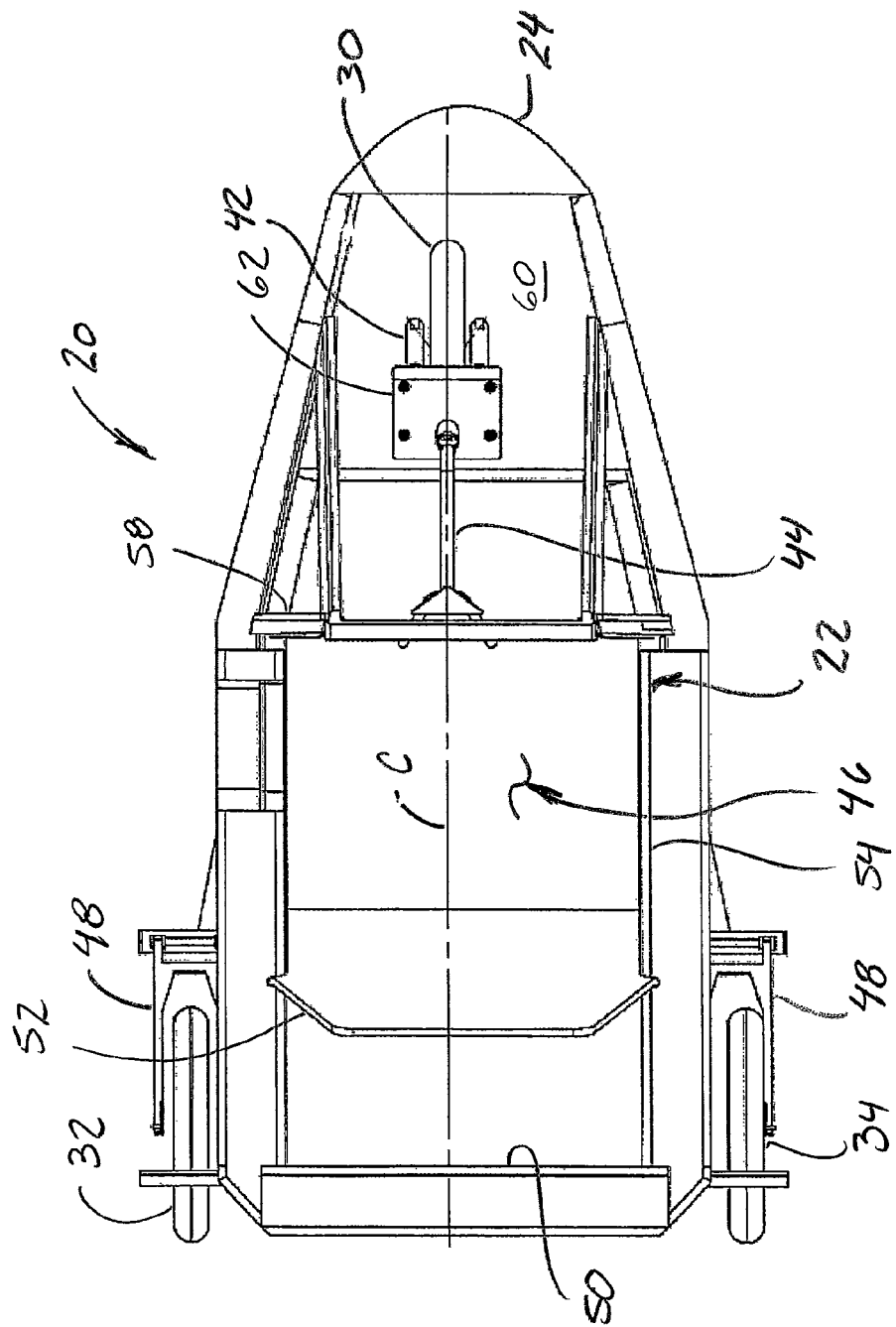
FIG. 2 is a schematic top plan of the light-weight vehicle of FIG. 1.

Referring to FIGS. 1 and 2, a light-weight vehicle of a first embodiment of the present disclosure is designated in its entirety by the reference number 20. The vehicle 20 comprises a support structure, generally designated by 22, on which energy absorbing material 24 is mounted. Three wheels 30, 32, 34 are also mounted on the support structure 22. In the embodiment of the vehicle 20 illustrated in FIGS. 1 and 2, a hub-mounted motor 40 drives the front wheel 30. The front wheel 30 is rotatably mounted on a fork assembly 42 that is pivotably mounted on the support structure 22 so the wheel is steerable using a tiller 44 attached extending rearward from a top end of the fork assembly into an occupant compartment, generally designated by 46, formed in the support structure. The rear wheels 32, 34 are rotatably mounted on swing arms 48 that are pivotably mounted on the support structure 22, allowing the wheels to move up and down relative to the support structure. In some embodiments, springs, shock absorbers, and elastomeric elements (not shown) are positioned between the swing arms 40 and support structure 22 to enhance occupant comfort. Many of the elements mentioned above are described in more detail in U.S. patent application Ser. No. 13/256,762, filed on Sep. 15, 2011, and entitled, "Reinforced Foam Vehicle Chassis", which is hereby incorporated by reference in its entirety.

The support structure 22 is formed from rigid core board panels 50 joined together. Although the panels 50 may be joined using other means without departing from the scope of the present disclosure, in one embodiment the panels are joined by welding. Further, the panels 50 may be initially held together during assembly using fasteners (e.g., screws). Alternatively, the panels may be held together using adhesives such as epoxy and resin, and fiber reinforcing materials.

The panels 50 may be formed in various ways without departing from the scope of the present disclosure. One embodiment of the panel 50 is a honeycomb core board material having an inner cell-core diameter of about 8.0 millimeters (mm), a capacity of about 80 to about 90 kilogram per cubic meter (kg/m$^3$), a compressive strength of 2.3 megapascals (MPa), and a shear strength of 0.5 MPa. One such material may be a fiberglass-type core board. In other embodiments, the panels may be made from a polypropylene honeycomb core sandwiched between polypropylene sheets having fiber reinforcement. It is envisioned that many different fibers may be used to reinforce the sheets. In one particular embodiment, the sheets are reinforced with woven fiberglass so the polypropylene constitutes about 40% to about 60% of the sheet volume. In still other embodiments, the panels may include polyethylene foam and honeycomb core board made from polyethylene. Similarly, fiber materials other than fiberglass may be used without departing from the scope of the present invention. For example, carbon fibers, ballistic resistant fibers (e.g., Kevlar fiber and Aramid fiber), or bamboo fibers may be used without departing from the scope of the present disclosure.

Forming the support structure 22 from core board has advantages. For example, the core board can be cut to different sizes to change the vehicle size and shape. As will be appreciated by those skilled in the art, the support structure 22 length and/or width may be modified without the need for new molds. If a stronger support structure 22 is required in a particular application to withstand greater loads, a stronger core board (e.g., a thicker core board or a core board having increased fiber reinforcement) may be selected. Further, using rigid core board panels 50 to form the support structure 22 provides several manufacturing advantages, including reduced time, greater simplicity, lower cost, increased safety, and improved reliability compared to many conventional methods of forming the support structure.

The rigid core board panels 50 provide occupant protection in the event of an accident. For example, a seat back 52 in the occupant compartment 46 may be formed from core board attached to core board panels 50 forming the sides 54 and bottom 56 of the support structure 22. Thus, the seat back forms a rigid part of the support structure 22. By extending the seat back 52 higher than a seated occupant's head, the seat back serves as a roll bar in the event of a roll-over accident. To further improve the function of the seat back 52, a top edge of the core board comprising the seat back may be reinforced (e.g., with extra layers of fiberglass) or braced (e.g., with steel tubing) to enhance its strength as a roll bar or to secure a shoulder harness (not shown) if desired. Because the seat back 52 acts as a roll bar, a roof added to the vehicle 20 can be made from lighter, lower strength, and lower cost material. Alternatively, the seat back 52 provides increased safety if the vehicle 20 is configured as a convertible without a rigid roof structure. In addition, it is envisioned that the seat back 52 in combination with a roll bar formed by a front windshield pillar 58 could establish a safety cage to withstand high speed rollover events.

Critical regions of the support structure 22 are reinforced with additional layers of the rigid core boards. For example, a forward bulkhead 60 to which the front wheel fork 44 and tiller 46 are mounted may require such additional layers of core board. Other such critical regions include mounting locations for suspension components, drivetrain components, and occupant seating. The critical regions may also have steel reinforcements such as plates 62 and tubes (not shown) fastened to the panels 50.

The inner core of the core board panels 50 absorbs impact energy, providing a primary layer of protection for vehicle occupants. A secondary layer of protection is provided by the energy absorbing material 24 covering exposed surfaces of the panels 50 (i.e., interior surfaces of the panels facing the occupant compartment 46 and exterior surfaces opposite the interior surfaces). In some embodiments, the energy absorbing material 24 includes a layer of resilient foam or padding that absorbs energy to reduce impact transmitted to the occupants or bystanders. Further, in some embodiments it is desirable that the energy absorbing material 24 be selectively removable from the surfaces of the panels 50. The energy absorbing material 24 is intended to provide front, rear, and side impact protection, as well as vehicle styling and aerodynamics. It is envisioned that the material 24 may be coated with a soft ultraviolet protective skin, such a vinyl coating, fabric, or rubber. The skin may be selected to provide a soft surface for those who contact it.

In some embodiments, the removable energy absorbing material 24 is attached to the panels 50 with an attachment means such as hook-and-loop (e.g., Velcro) fasteners, snaps, or hook attachments to facilitate the ease of removal and replacement. Providing removable material 24 enables consumers to easily alter the aesthetic appearance of the vehicle 20. It is envisioned in one example, that a light-weight vehicle of the present disclosure may be utilized as a business delivery vehicle, such as a courier, with suitable advertisement and business graphics displayed on the exterior surfaces during business hours, and rapidly be switched to personal use by replacement of the exterior removable panels to ones without advertisement and business graphics when not in use for business.

In some embodiments, the energy absorbing material 24 comprises polyethylene foam, which rebounds without leaving dents and is relatively inexpensive. An exemplary closed-cell foam is a polyurethane foam having a density of 40 kg/m$^3$, a closed cell content of 95%, a compressive strength about 32.9 pounds per square inch (psi), a tensile strength of about 50 psi, a shear strength of 40 psi, and a flexural strength of 60 psi. Those of ordinary skill in the art will recognize that other types of foam and padding may be used on the surfaces of the vehicle 20 without departing form the scope of the invention. For example, vinyl and spandex cloth may be used on the exterior surfaces to obtain a weather-proof finish, and a softer open cell foam covered with vinyl or cloth may be used on the inside surfaces.

It is envisioned that a foam that compresses under a load of less than 250 newtons may be particularly advantageous. In one off-center crash test at 20 miles per hour, a vehicle covered with such a foam had very little cosmetic damage, no structural damage, and would be unlikely to cause injury. Further, because of the materials used, the cost to repair the cosmetic damage is very low. During higher speed crash tests at 40 mph, it has been observed that the external vinyl and foam stretches and then splits to absorb impact energy, and the vehicle 20 support structure 22 limited the seatbelt g-loads experienced by the occupants during the crash to about 6 g which is less than half that of conventional cars. During the higher speed test, the hub motor was not damaged, the support structure underwent a loading of about 25 g, and the vehicle was repairable rather than being a total loss.

When the energy absorbing material 24 is made from foam, the rigid core board support structure 22 can be made from flat panels because the exterior layer of foam supplies the styling, outer body aesthetics, and aerodynamic shaping. This greatly reduces cost and eliminates the need for gel coatings because the rough manufacturing finish on the surfaces of the core board support structure is hidden from view by the foam. The foam can be easily manufactured and designed with desired contours when one side is against the flat supporting surface of the core board support structure 22.

In some embodiments, the rigid panels 50 are configured to provide the vehicle 20 with a generally wedge-shaped configuration, suitable for a single, steered front wheel 30 and a pair of independent rear wheels 32, 34 laterally spaced on opposite sides of a vehicle centerline C. As illustrated in FIG. 2, the narrow wedge-shaped configuration of the vehicle nose tends to deflect frontal impacts, reducing the amount of damage and impact energy absorbed by the vehicle and increasing safety to both occupants and bystanders.

One substantial advantage of the light-weight vehicle 20 illustrated in FIG. 1 and is that it may be powered by a small, low-power motor to achieve suitable travel speeds. The light weight of the vehicle 20 also enables the use of electric motors or electric hybrid motors, requiring less power to propel the vehicle, and correspondingly, reducing the size of the required energy storage cells (i.e., batteries) and the size of the driving motor, thereby reducing vehicle emissions and environmental impact.

Figure 3:
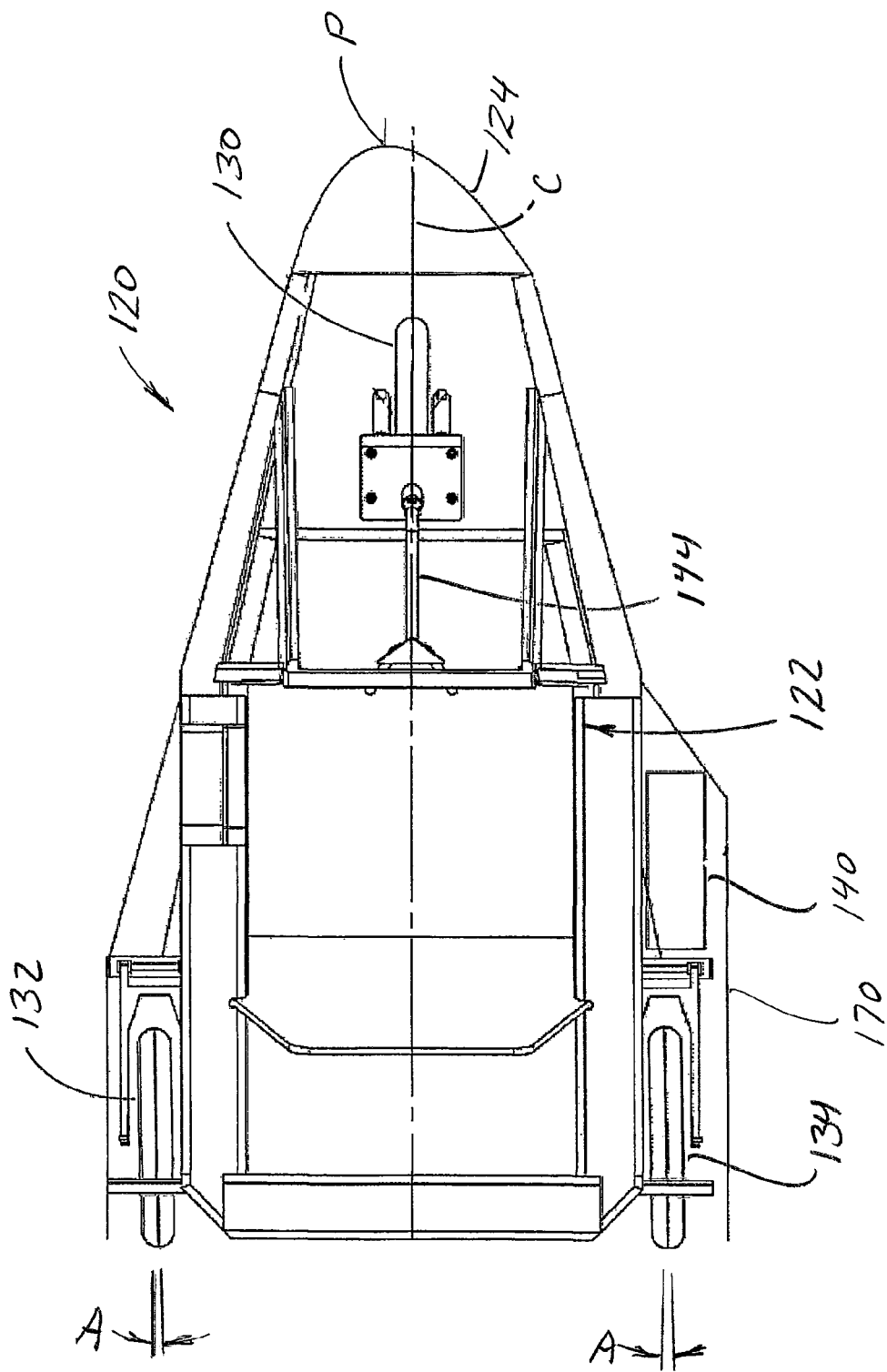
FIG. 3 is a schematic top plan of a light-weight vehicle of a second embodiment of the present disclosure.

As shown in FIG. 3, a second embodiment of a light-weight vehicle is designated in its entirety by the reference number 120. The vehicle 120 of the second embodiment is similar to that of the first embodiment described above except that a motor 140 is operatively connected to one of the rear wheels 134 rather to the front wheel 130. When powering the vehicle 120 by one rear wheel 134, the off-center drive forces push the vehicle to steer toward the side opposite the driven wheel. In order to accommodate a single driven rear wheel 134 that is offset from the vehicle centerline C, the vehicle 120 steered wheel 130 is disposed generally on the vehicle longitudinal axis and raked for stability. Raking the front steered wheel 130 at an angle from about 20° to about 30° as shown in FIG. 1, similarly to a motorcycle is believed to be best for stability and produces less lateral steering pull when accelerating than would occur with less rake. A long steering tiller 144 also lessens the force required to keep the vehicle 120 going straight. The steering tiller 144 may be configured to bend or collapse if impacted. Optionally, placing energy-absorbing foam (not shown) in the hollow core of the steering tiller 144 may further soften any impact.

Furthermore, in order to compensate for the offset driving force from the single-driven rear wheel 134, the vehicle support structure 122 is configured with a larger fender 170 or flares on the same side as the driven wheel. The larger fender 170 imparts an increased aerodynamic drag on the corresponding side of the vehicle 120 to compensate for the offset driving force. The offset driving force is greater at higher speeds. The aerodynamic forces provided by the larger fender 170 also increase with vehicle speed to offset the drive force, and can help to reduce tire wear, as well as wear on the suspension and bearings.

Other means may be used with or separately from the larger fender 170 to compensate for the offset driving force from single-driven rear wheel 134. One such means is angling the rear wheels 132, 134 away from the side having the motor 140 by some predetermined thrust angle A. In one particular embodiment, the rear wheels 132, 134 are angled with respect to the vehicle centerline C about 2°.

Another means to compensate for the offset driving force is to form the layer of energy absorbing material 124 at the nose of the vehicle 120 to have an asymmetric shape with respect to the longitudinal centerline C configured to impart an offset drag force on the vehicle 120 to at least partially counteract the turning force imparted on the vehicle by the motor 140. As illustrated in FIG. 3, the layer of energy absorbing material 124 mounted at a front end of the support structure 122 is laterally angled so that a forward-most point P on the nose is laterally offset from the longitudinal centerline C.

Figure 4:
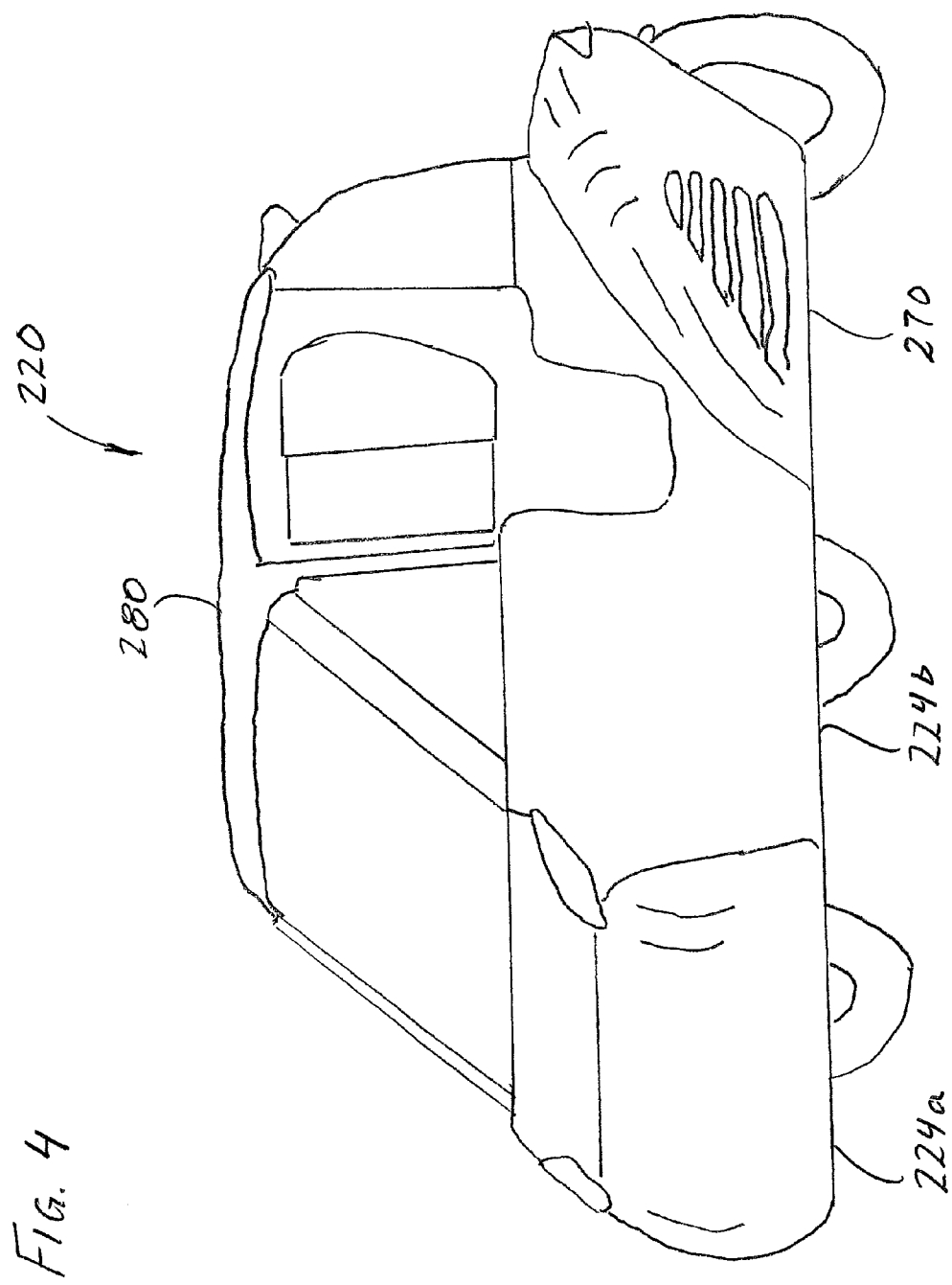
FIG. 4 is a perspective of a light-weight vehicle of a third embodiment.

FIG. 4 illustrates a third embodiment of the vehicle 220 in which the energy absorbing layers are constructed from different materials in different regions of the vehicle. Different materials may be chosen for the particular regions of the vehicle 220 based on the expected loading on those regions. For example, a layer of energy absorbing material 224a applied to a front end of the support structure 222 may be selected for its high impact and energy absorbing capability. In one embodiment, the layer 124a may be constructed from closed cell polyurethane. Other regions of the vehicle 220 such as the sides may include energy absorbing materials that are less expensive and more aesthetically pleasing. For example, a layer of energy absorbing material 224b applied to the sides of the support structure 222 may be constructed from polystyrene covered with polycarbonate. Other regions of the vehicle that require less energy absorption may be made from less energy absorbing materials. For example, in one embodiment the top 280 and fenders 270 of the vehicle 220 are made from polypropylene.

Figure 5:
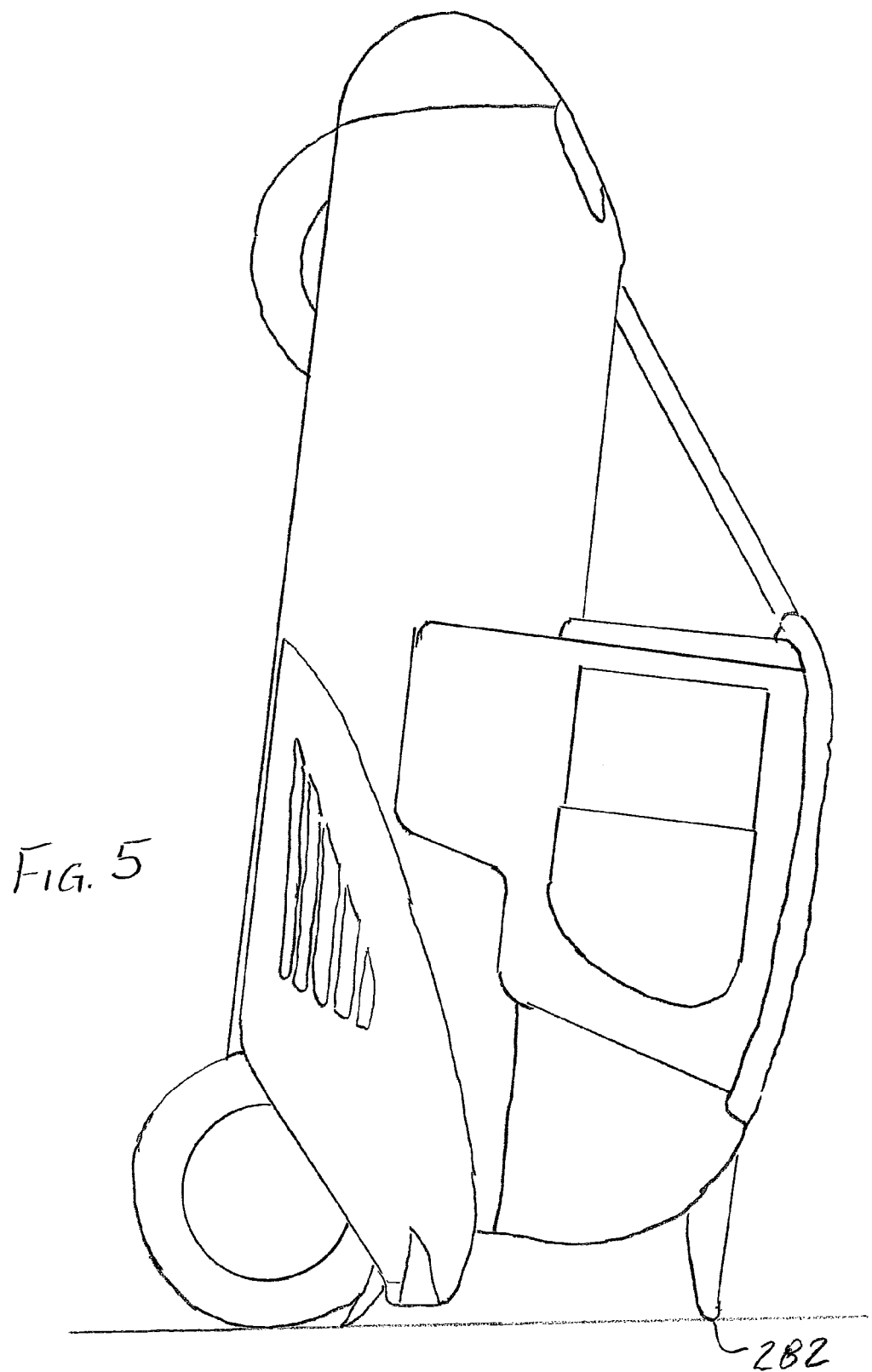
FIG. 5 is a side elevation of the light-weight vehicle of FIG. 4 shown in a parked orientation.

FIG. 5 illustrates a further advantage provided by the vehicle 220 of the third embodiment. The vehicle 220 has an overall configuration and weight distribution adapted to enable the vehicle to be rotated to rest on a rear surface 28. This orientation permits a smaller footprint for vehicle storage or shipping. The rear surface 282 may be reinforced to prevent damage to the surface when the vehicle rests on it.

Figure 6:
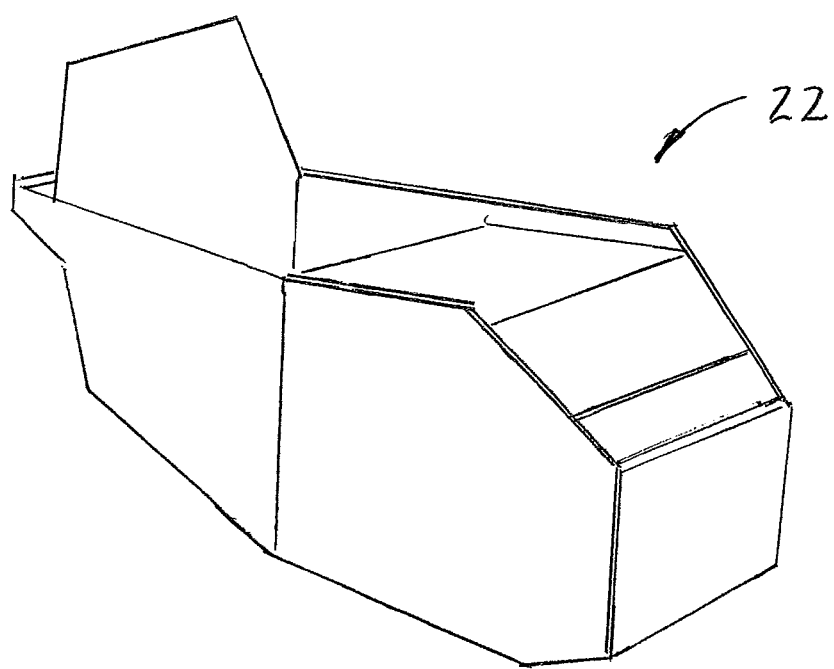
FIG. 6 is a perspective of a support structure of an exemplary light-weight vehicle.
Figure 7:
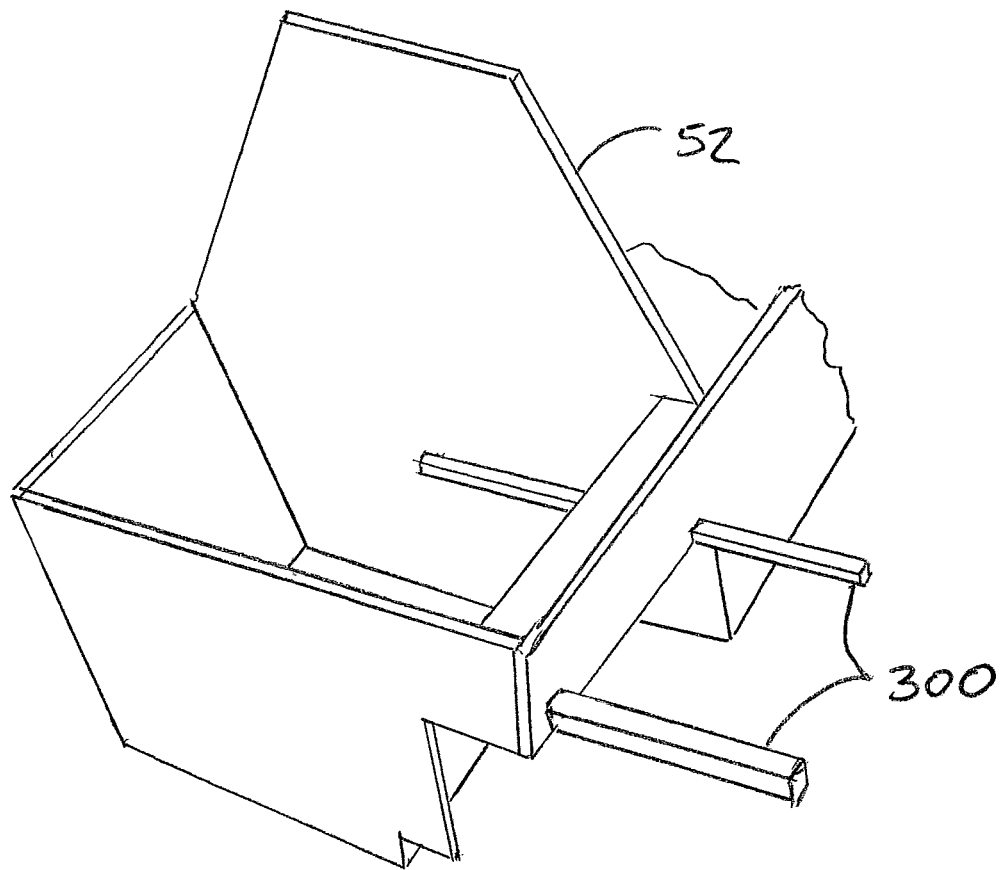
FIG. 7 is a fragmentary perspective of a support structure of FIG. 6 showing reinforcing motor mounts.
Figure 8:
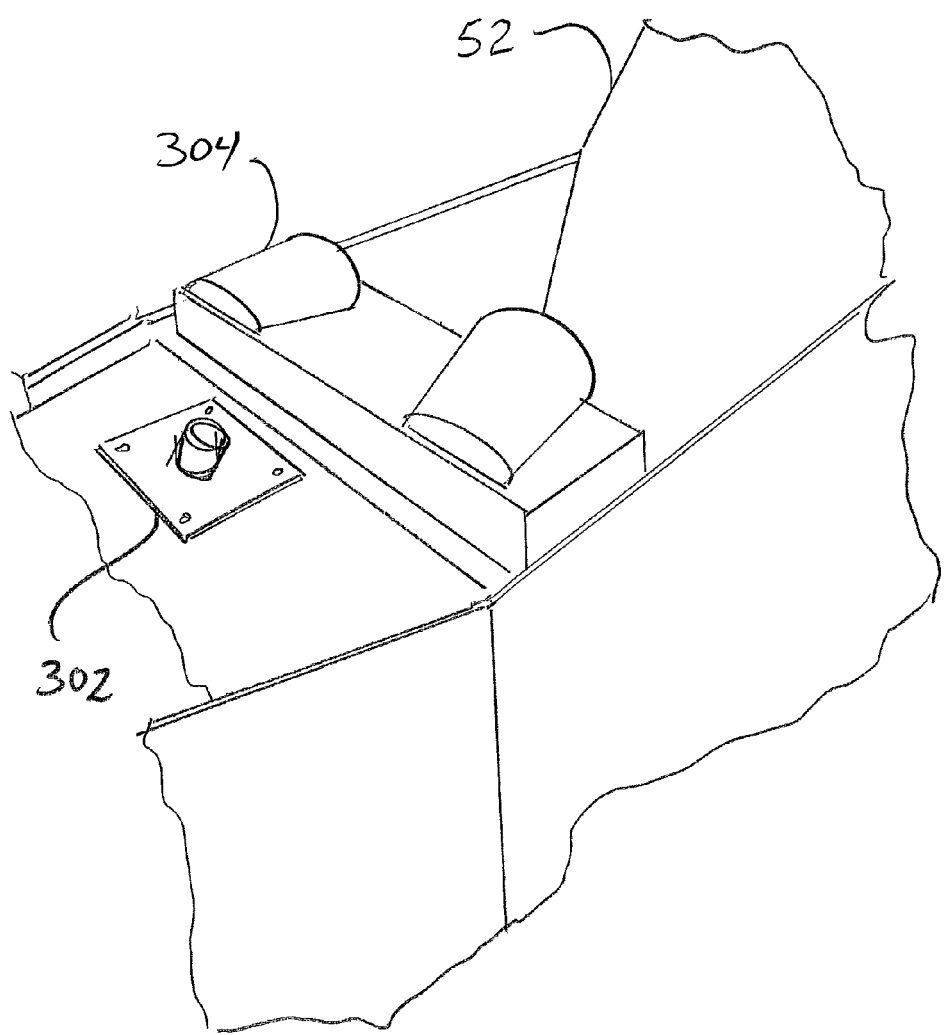
FIG. 8 is a fragmentary perspective of the structure of FIG. 6 showing a reinforcing steering mount and a dashboard assembly.

To manufacture the support structure 22, core board is cut into panels. In one particular preferred embodiment, a single piece of core board is used to make one support structure 22. The board is cut to size and milled partially through its thickness where corners are to be made. The mill cuts through one of the sheets and through the honeycomb core, leaving the opposite sheet intact. Although the board may be manually cut, in one embodiment a numerically controlled machine tool is used to automate the cutting and milling. The cut and milled board is folded to shape as shown in FIG. 6. Temporary fasteners (e.g., screws) or fixturing may be used to hold the board in the desired configuration while the panels are permanently fastened together. In some embodiments, edges of the adjacent panels may be welded (i.e., fused together by melting the panels with a conventional plastics welding gun) to hold the support structure 22 together. As the panels are joined, various reinforcement members may be installed. For example, as illustrated in FIG. 7 metal tubes 300 may be adhesively bonded in position behind the seat back 52 for holding the motor (not shown). Further, metal plates 302 may be fastened to a panel in front of the seat back 52 as shown in FIG. 8 for holding a bearing assembly that receives the fork assembly (not shown). Other elements may also be bonded in place. For example, a dashboard assembly having an instrument panel 304 may be installed as shown in FIG. 8. As the build continues, foam and padding may be installed on surfaces of the panels and other hardware and vehicle systems may be installed using conventional methods and techniques.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A motorized vehicle, comprising:
    a support structure having a longitudinal centerline and an occupant compartment;
    a front wheel mounted on the support structure, said front wheel being steerable from the occupant compartment;
    a pair of rear wheels laterally spaced from each other and positioned on opposite sides of the longitudinal centerline; and
    a motor mounted on the support structure and operatively connected to only one wheel of said pair of rear wheels;
    wherein the rear wheels are angled with respect to the longitudinal centerline at a predetermined thrust angle to at least partially counteract a turning force imparted on the vehicle by the motor.

2. A motorized vehicle as set forth in claim 1, wherein the predetermined thrust angle is about 2°.

3. A motorized vehicle as set forth in claim 1, further comprising a layer of energy absorbing material mounted on an exterior surface of the support structure having an asymmetric overall shape with respect to the longitudinal centerline configured to impart an offset aerodynamic drag force on said vehicle to at least partially counteract a turning force imparted on the vehicle by the motor.

4. A motorized vehicle as set forth in claim 3, wherein the layer of energy absorbing material includes a nose mounted on a front end of the support structure, the nose being laterally angled so that a forward-most point on the nose is laterally offset from the longitudinal centerline.

5. A motorized vehicle, comprising:
    a support structure having a longitudinal centerline and an occupant compartment;
    a front wheel mounted on the support structure, said front wheel being steerable from the occupant compartment;
    a pair of rear wheels laterally spaced from each other on opposite sides of the longitudinal centerline;
    a motor mounted on the support structure and operatively connected to one wheel of said pair of rear wheels; and
    a layer of energy absorbing material mounted on the exterior surface of the support structure having an asymmetric overall shape with respect to the longitudinal centerline configured to impart an offset drag force on said vehicle to at least partially counteract a turning force imparted on the vehicle by the motor.

6. A motorized vehicle as set forth in claim 5, wherein the layer of energy absorbing material comprises closed cell foam including at least one material selected from a group of materials consisting of polyurethane, polystyrene, polyethylene, and polypropylene.

7. A motorized vehicle as set forth in claim 6, wherein the closed cell foam comprises polypropylene.

8. A motorized vehicle as set forth in claim 6, wherein the closed cell foam comprises polystyrene laminated with a polycarbonate.

9. A motorized vehicle as set forth in claim 5, wherein said layer of energy absorbing material compresses under a force less than about 250 newtons.

10. A motorized vehicle as set forth in claim 5, wherein said support structure includes a rear surface and the vehicle has a weight distribution permitting the vehicle to rest stably on said rear surface for storage.

11. A motorized vehicle as set forth in claim 5, wherein the rear wheels are angled with respect to the longitudinal centerline at a predetermined thrust angle to at least partially counteract a turning force imparted on the vehicle by the motor.

12. A motorized vehicle as set forth in claim 11, wherein the predetermined thrust angle is about 2°.

13. A motorized vehicle as set forth in claim 5, wherein the layer of energy absorbing material includes a nose mounted on a front end of the support structure, the nose being laterally angled so that a forward-most point on the nose is laterally offset from the longitudinal centerline.

14. A motorized vehicle as set forth in claim 5, wherein:
    the support structure comprises a plurality of rigid core board panels joined together to form the support structure;
    the support structure includes an exterior surface and an interior surface opposite said exterior surface;
    the interior surface of the support structure faces the occupant compartment; and
    each of said panels comprises a honeycomb core sandwiched between opposing fiberglass-reinforced sheets.

15. A motorized vehicle as set forth in claim 14, wherein the honeycomb core comprises polypropylene.

16. A motorized vehicle as set forth in claim 15, wherein the fiber-reinforced sheets comprise polypropylene.

17. A motorized vehicle as set forth in claim 16, wherein the fiber-reinforced sheets comprise woven fiberglass at least partially surrounded by the polypropylene.

18. A motorized vehicle as set forth in claim 17, wherein the fiber-reinforced sheets comprise about 40% to about 60% polypropylene by volume.

19. A motorized vehicle as set forth in claim 14, wherein the plurality of rigid core board panels are joined by welding the panels together.

* * * * *